Nov. 12, 1929.  B. HART ET AL  1,735,756
ICE CREAM DIPPER SCRAPER
Filed April 4, 1928
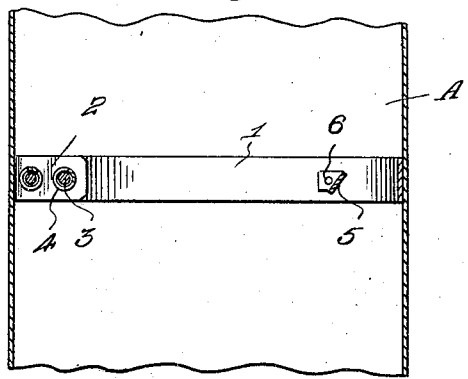
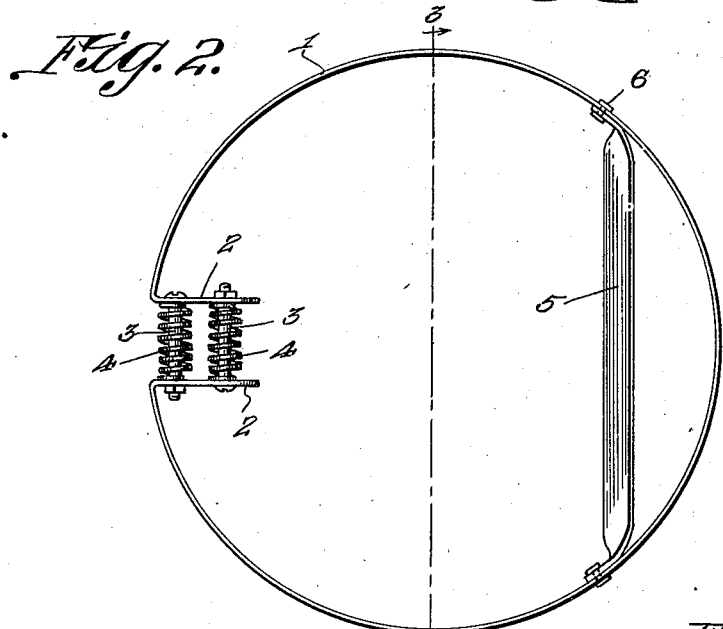
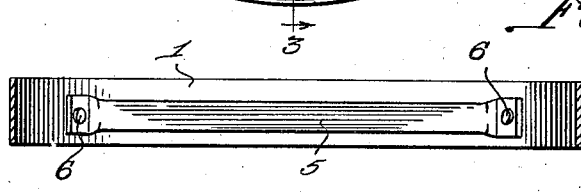
B. Hart,
F. Holmes,
INVENTOR
BY Victor J. Evans
ATTORNEY
WITNESS:

Patented Nov. 12, 1929

1,735,756

UNITED STATES PATENT OFFICE

BERT HART AND FOREST HOLMES, OF CARTHAGE, NEW YORK

ICE-CREAM-DIPPER SCRAPER

Application filed April 4, 1928. Serial No. 267,372.

The general object of this invention is to provide a scraper for scraping surplus ice cream or the like off of a dipper or scoop, with means for removably holding the scraper in a freezer or container so that the cream removed by the scraper will drop into the freezer or container.

Another object of the invention is to provide a ring-shaped holder for the scraper, with spring means for expanding the holder against the inner walls of the container or freezer to hold the device in place.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:—

Figure 1 is a sectional view showing the device in a freezer or container.

Figure 2 is a plan view of the device.

Figure 3 is a section on line 3—3 of Figure 2.

As shown in these views, the device comprises a ring-shaped holder 1 which has its ends separated and extending inwardly, as shown at 2, with bolts 3 passing through said ends and a spring 4 on each bolt for pressing the ends against the heads and nuts of the bolts. This connection serves to permit the ring-shaped holder to be contracted and placed in a freezer or container, such as shown at A in Figure 1, and then the springs will expand the holder against the inner walls of the container and thus removably hold the device in place.

An obliquely arranged scraping blade 5 has its ends twisted and fastened by rivets 6 or the like to the holder, this blade being arranged adjacent that side of the holder which is opposite the separated ends thereof.

From the foregoing it will be seen that when the device is placed in a container or freezer A, the scraping blade will be in a position to scrape the surplus ice cream from the dipper or scoop used to remove the ice cream in small quantities from the container without interfering with the dipping of the cream in the container by the scoop or dipper, and as the dipper or scoop is lifted from the container, its upper end is drawn against the blade so that the surplus cream will be removed from the dipper. When the container is empty, the device can be easily removed and placed in a filled container.

This device eliminates the use of a knife or the like for scraping surplus cream from a dipper or scoop.

It is thought from the foregoing description that the advantages and novel features of our invention will be readily apparent.

It is to be understood that we may make changes in the construction and in the combination and arrangement of the several parts, provided that such changes fall within the scope of the appended claims.

What we claim is:—

1. A device of the class described comprising a split ring adapted to be placed in a container, a scraper blade carried by the ring and spring means for expanding the ring to hold it against the inner walls of the container.

2. A device of the class described comprising a ring having its ends separated and extending inwardly, a bolt passing through said ends, a spring on the bolt pressing the ends against the head and nut of the bolt and permitting the spring to be contracted and a scraper blade having its ends fastened to parts of the inner wall of the ring.

In testimony whereof we affix our signatures.

BERT HART.
FOREST HOLMES.